United States Patent
Hirata

(10) Patent No.: US 8,162,544 B2
(45) Date of Patent: Apr. 24, 2012

(54) GAS BEARING SPINDLE

(75) Inventor: Junichi Hirata, Iwata (JP)

(73) Assignee: NTN Corporation, Osaka (JP)

( * ) Notice: Subject to any disclaimer, the term of this patent is extended or adjusted under 35 U.S.C. 154(b) by 189 days.

(21) Appl. No.: 12/769,437

(22) Filed: Apr. 28, 2010

(65) Prior Publication Data

US 2010/0284638 A1    Nov. 11, 2010

(30) Foreign Application Priority Data

May 7, 2009   (JP) .................... 2009-112610

(51) Int. Cl.
*F16C 32/06*   (2006.01)
(52) U.S. Cl. ............... 384/100; 384/107; 384/114
(58) Field of Classification Search .......... 384/100, 384/107–124
See application file for complete search history.

(56) References Cited

U.S. PATENT DOCUMENTS

| | | | | |
|---|---|---|---|---|
| 4,836,692 | A * | 6/1989 | Hagen | 384/107 |
| 7,201,379 | B2 * | 4/2007 | Lemetteil | 384/119 |
| 2004/0109622 | A1 * | 6/2004 | Fujikawa et al. | 384/107 |

FOREIGN PATENT DOCUMENTS

| | | |
|---|---|---|
| GB | 884915 | 12/1961 |
| JP | 2002-295470 | 10/2002 |
| JP | 2007-170534 | 7/2007 |

OTHER PUBLICATIONS

European Search Report issued in European Patent Application No. EP 10161394.1 dated Jul. 22, 2010.

* cited by examiner

*Primary Examiner* — Thomas R Hannon
(74) *Attorney, Agent, or Firm* — McDermott Will & Emery LLP

(57) ABSTRACT

A gas bearing spindle includes a rotation shaft, a sleeve, and a housing. The sleeve includes a bearing portion formed of a nonmetallic sintered body; and a retaining ring formed of a metal. Further, the retaining ring and the bearing portion are in contact with each other at a first fit surface that is a boundary surface between the outer circumferential surface of the bearing portion and the inner circumferential surface of the retaining ring, as well as at a second fit surface that is a boundary surface between the outer circumferential surface of the bearing portion and the inner circumferential surface of the retaining ring, is distant further away from the sleeve through hole relative to the first fit surface, and is formed adjacent to a center of the sleeve through hole in a direction in which the sleeve through hole extends, when viewed from the first fit surface.

13 Claims, 4 Drawing Sheets

GAS BEARING SPINDLE

BACKGROUND OF THE INVENTION

1. Field of the Invention

The present invention relates to a gas bearing spindle, more particularly, a gas bearing spindle used in precision machining equipment, a hole drilling machine, an electrostatic coating machine, or the like.

2. Description of the Background Art

In a gas bearing spindle including a gas bearing for supporting a rotation shaft relative to a housing by supplying a compressed gas such as compressed air to a small clearance between the rotation shaft and a member opposite to the rotation shaft within the housing, the rotation shaft is supported relative to the housing in a non-contact manner. Hence, not only friction loss is small in the bearing but also the member is not fatigued or worn out in a normal operation state because the rotation shaft and the member opposite to the rotation shaft are not in direct contact with each other. Taking advantage of such a feature, the gas bearing spindle is widely used as a high-speed spindle used in precision machining equipment, a hole drilling machine, an electrostatic coating machine, or the like.

There have been made various proposals for improved performance of such a gas bearing spindle. For example, a proposed gas bearing spindle employs a sleeve having an inner wall formed of graphite as the member opposite to the rotation shaft, in order to avoid seizing of the rotation shaft even if the rotation shaft and the member opposite to the rotation shaft are brought into contact with each other. Meanwhile, a gas bearing spindle may be adopted which is capable of absorbing whirling vibration of the rotation shaft by supporting a sleeve, which serves as the member opposite to the rotation shaft, relative to the housing by means of an O ring (for example, see Japanese Patent Laying-Open No. 2002-295470 (Patent Document 1) and Japanese Patent Laying-Open No. 2007-170534 (Patent Document 2)).

FIG. 5 is a schematic cross sectional view showing an exemplary conventional gas bearing spindle. Referring to FIG. 5, the exemplary conventional gas bearing spindle will be described.

Referring to FIG. 5, conventional gas bearing spindle 100 includes a rotation shaft 110; a sleeve 130 having a sleeve through hole 133, which is a cylindrical through hole that surrounds a portion of an outer circumferential surface 111A of rotation shaft 110; and a housing 120 surrounding sleeve 130 to retain sleeve 130 by means of O rings 141, 142 each formed of a rubber. Rotation shaft 110 and sleeve 130 are disposed with a small journal bearing clearance 113 therebetween.

Rotation shaft 110 has a shaft portion 111 cylindrical in shape; and a flange portion 112 formed in one end of shaft portion 111 and having a large disk-like shape with a diameter larger than that of shaft portion 111. In the other end of shaft portion 111, a retaining unit 119 is formed to retain a tool or the like. Sleeve 130 is provided with a plurality of journal nozzles 151 formed in the circumferential wall of sleeve 130 to supply a gas for bearing to a journal bearing clearance 113 provided between the inner circumferential surface of sleeve through hole 133 and outer circumferential surface 111A of shaft portion 111 of rotation shaft 110.

Journal nozzles 151 are arranged in two rows extending in the circumferential direction of sleeve through hole 133. Specifically, journal nozzles 151 are provided in the rows at respective sides that interpose therebetween the central portion of sleeve 130 in a direction in which sleeve through hole 133 extends (axial direction of shaft portion 111 of rotation shaft 110).

With the above-described configuration, sleeve 130 serves as a gas journal bearing for supporting rotation shaft 110 relative to housing 120 in a non-contact manner in a direction (radial direction) perpendicular to the axial direction of shaft portion 111. Furthermore, in housing 120, thrust bearings 160 annular in shape are disposed so that one base surface of each thrust bearing 160 is opposite to each of base surfaces 112A of the opposite sides of flange portion 112 of rotation shaft 110. Here, thrust bearing 160 and flange portion 112 of rotation shaft 110 are separated with a small thrust bearing clearance 114 therebetween. Thrust bearings 160 are provided with a plurality of thrust nozzles 161 for supplying a gas to thrust bearing clearance 114 provided between the one base surface of each thrust bearing 160 and each of base surfaces 112A of flange portion 112 opposite thereto. The plurality of thrust nozzles 161 are formed in a direction along the circumferential direction of flange portion 112.

Each of journal nozzles 151 is connected to a bearing gas supply path 121, which is formed within housing 120, via a sleeve gas supply path 152 and an annular space 122, which is a space closed by sleeve 130, housing 120, and O ring 142. On the other hand, each of thrust nozzles 161 is connected to bearing gas supply path 121 via a thrust bearing gas supply path 162. Further, bearing gas supply path 121 is connected to a bearing gas supply source, such as an air compressor, having a function of supplying a high-pressure gas such as air, disposed external to gas bearing spindle 100, and not shown in the figure.

Further, in a portion of flange portion 112, i.e., in an outer circumferential portion thereof, there is formed a thin portion 112B having an axial thickness thinner than that of adjacent portion in flange portion 112. On one base surface of thin portion 112B, turbine blades 115 are formed. Turbine blades 115 thus formed are arranged in the circumferential direction of flange portion 112, have a plate-like shape, and are adapted to receive an incoming gas to rotate rotation shaft 110 in the circumferential direction of flange portion 112. Furthermore, in housing 120, a turbine nozzle 173 is formed at an outer circumferential side relative to flange portion 112. Turbine nozzle 173 has an opening at its portion facing turbine blades 115, and is configured to be capable of jetting a drive gas such as a compressed gas from the inner wall of housing 120 toward turbine blade 115. Turbine nozzle 173 is connected to a drive gas supply path 171 via a circumferential groove 172 formed to extend in the direction along the outer circumference of flange portion 112. Drive gas supply path 171 is connected to a drive gas supply source, such as an air compressor, having a function of supplying a high-pressure gas such as air, disposed external to gas bearing spindle 100, and not shown in the figure. Furthermore, housing 120 is provided with a drive gas discharge path 175 having one opening and the other opening. The one opening is provided in the surface thereof at the side where turbine blades 115 on thin portions 112B of flange portion 112 are formed, specifically, is provided at a location opposite to a region at an inner circumferential side relative to the region in which turbine blades 115 are formed. The other opening is formed at an outer wall of housing 120.

Here, sleeve 130 includes a bearing portion 131 formed of a nonmetallic sintered body and retaining rings 132 formed of a metal. Bearing portion 131 has sleeve through hole 133, and has an outer circumferential surface, a portion of which constitutes the outer circumferential surface of sleeve 130. Bearing portion 131 is configured so that the inner circumferential surface of sleeve through hole 133 is opposite to outer circumferential surface 111A of rotation shaft 110. Retaining rings 132 are fit into the outer portions of the ends of the opposite sides of bearing portion 131 in the direction in which sleeve through hole 133 extends (axial direction of rotation shaft 110), so as to retain sleeve 130 relative to housing 120 by means of O rings 141, 142 each serving as an elastic member and formed of a rubber.

As such, sleeve 130 has bearing portion 131 formed of a sintered material such as graphite, so seizing of rotation shaft 110 can be prevented even if rotation shaft 110 and sleeve 130 are brought into contact with each other. Furthermore, since sleeve 130 is supported relative to housing 120 by means of O rings 141, 142, whirling vibration of rotation shaft 110 can be attenuated.

However, the above-described conventional gas bearing spindle has a problem as described hereinafter. FIGS. 6 and 7 are schematic cross sectional views showing one exemplary supporting structure of the sleeve in the conventional gas bearing spindle.

As described above, in the conventional gas bearing spindle shown in FIG. 5, in order to rotatably support rotation shaft 110 relative to sleeve 130 in a non-contact manner, a compressed gas is supplied to annular space 122 from a bearing gas supply unit not shown in the figure. Here, as shown in FIG. 6, a small clearance 190 is formed between each retaining ring 132 and bearing portion 131 in the axial direction. Clearance 190 communicates with annular space 122. Hence, when annular space 122 is supplied with the compressed gas, due to a difference from pressure of atmosphere, force is generated in the axial direction of retaining ring 132 in proportion to the area of a ring geometry having an outer diameter $\phi D$ and inner diameter $\phi d_1$. The force thus generated may cause deviation of retaining ring 132 relative to bearing portion 131 in a fit surface 180 therebetween. The deviation of retaining ring 132 causes deviation of the interval between retaining ring 132 and housing 120 from its original value, which may hinder elastic deformation of O rings 141, 142 upon whirling vibration of rotation shaft 110, thereby decreasing performance of gas bearing spindle 100.

To address this, the force generated in retaining ring 132 can be reduced by reducing the thickness of retaining ring 132 to provide retaining ring 132 with a larger inner diameter $\phi d_1$. However, retaining ring 132 needs to be provided with grooves 132A for retaining O rings 141, 142, so it is difficult to make retaining ring 132 thinner significantly. Further, upon drilling sleeve through hole 133 in the process of manufacturing sleeve 130, it is preferable to retain sleeve 130 so that stress is imposed on retaining ring 132 formed of a metal and having a toughness higher than that of bearing portion 131 formed of a nonmetallic sintered body, but retaining ring 132 reduced in its thickness has a decreased rigidity and therefore sleeve 130 may be deformed by the stress when it retains sleeve 130.

Further, as shown in FIG. 7, if sleeve gas supply path 152 is formed to penetrate bearing portion 131 of sleeve 130 and fit surface 180 of retaining ring 132, bearing portion 131 and retaining ring 132 are deviated from each other at fit surface 180 in the rotation direction when rotation shaft 110 rotating fast are brought into contact with bearing portion 131. Accordingly, the communication between each of sleeve gas supply paths 152 provided in retaining ring 132 and each of journal nozzles 151 provided in bearing portion 131 are disconnected, thereby blocking sleeve gas supply paths 152. When each of sleeve gas supply paths 152 is thus blocked, the compressed gas cannot be supplied to bearing clearance 113, which disadvantageously makes it difficult to support rotation shaft 110 in a non-contact manner.

SUMMARY OF THE INVENTION

The present invention is made to solve the above-described problems of the above-described conventional gas bearing spindle, and its object is to provide a gas bearing spindle capable of preventing deviation of a retaining ring when a compressed gas is supplied thereto.

A gas bearing spindle according to the present invention includes: a rotation shaft; a sleeve having a sleeve through hole, which is a cylindrical through hole surrounding at least a portion of an outer circumferential surface of the rotation shaft; and a housing, surrounding the sleeve, for retaining the sleeve using an elastic member. The sleeve includes a bearing portion having the sleeve through hole and formed of a nonmetallic sintered body, and a retaining ring, fit into an outer circumferential surface of the bearing portion and formed of a metal, for retaining the bearing portion relative to the housing the elastic member. The retaining ring and the bearing portion are in contact with each other at a first fit surface, which is a boundary surface between the outer circumferential surface of the bearing portion and an inner circumferential surface of the retaining ring, as well as at a second fit surface, which is a boundary surface between the outer circumferential surface of the bearing portion and the inner circumferential surface of the retaining ring, is distant further away from a central axis of the sleeve through hole relative to the first fit surface, and is formed adjacent to a center of the sleeve through hole in a direction in which the sleeve through hole extends, when viewed from the first fit surface.

As described above, when the spindle is supplied with a compressed gas, the retaining ring receives axial force due to a difference from pressure of atmosphere. In order to address this, the gas bearing spindle of the present invention is provided with the second fit surface formed adjacent to the center in the axial direction when viewed from the first fit surface and distant further away from the central axis of the sleeve through hole relative to the first fit surface. In this way, in the retaining ring, an area that receives the force resulting from the difference from the pressure of atmosphere can be reduced, thereby reducing force imposed on the retaining ring. Further, the fastening force obtained by fitting the retaining ring and the bearing portion into each other is proportional to an area of the fit surfaces. In the gas bearing spindle of the present invention, the second fit surface is distant further away from the central axis of the sleeve through hole relative to the first fit surface, i.e., the fit surface has a long circumferential length. In this way, an area per unit length in the axial direction is large in the fit surface, thereby achieving strong fastening force.

Further, fastening torque in the circumferential direction resulting from the fitting thereof is proportional to the size of a diameter of a fit surface. In the gas bearing spindle of the present invention, the second fit surface is distant further away from the central axis of the sleeve through hole relative to the first fit surface. In this way, strong fastening torque is likely to be obtained. Hence, even if the rotation shaft rotating fast is brought into contact with the bearing portion, the bearing portion and retaining ring are prevented from being deviated at the fit surfaces in the rotation direction.

As described above, according to the gas bearing spindle of the present invention, the retaining ring can be prevented from being deviated when a compressed gas is supplied thereto.

In the gas bearing spindle, the bearing portion may be provided with a nozzle, having an opening to face the sleeve through hole, for supplying a gas to a bearing clearance which is a clearance between the sleeve and the rotation shaft, and the retaining ring may be provided with a sleeve gas supply path penetrating the retaining ring. In this case, in a region including a boundary between the retaining ring and the bearing portion of the sleeve, a gas supply groove annular in shape and communicating the sleeve gas supply path and the nozzle with each other to supply a gas to the nozzle is preferably formed to surround the sleeve through hole.

By adopting such a configuration, even if the rotation shaft rotating fast is brought into contact with the bearing portion and the retaining ring is accordingly deviated relative to the bearing portion in the circumferential direction, the compressed gas supplied to the sleeve gas supply path is provided to the annular gas supply groove, from which the compressed gas is supplied to the bearing clearance via the nozzle. Hence, even if the retaining ring is deviated relative to the bearing portion in the circumferential direction, the compressed gas can be supplied to the bearing clearance more securely. Further, in assembling the bearing portion and the retaining ring in the process of manufacturing the sleeve, the sleeve gas supply path and the nozzle do not need to be aligned in the circumferential direction.

In the gas bearing spindle, preferably, the gas supply groove is formed to encompass the first fit surface. In this way, the effect resulting from the formation of the gas supply groove can be obtained without preventing the fastening force and hermeticity from being provided by the second fit surface.

In the gas bearing spindle, preferably, the outer circumferential surface of the bearing portion is entirely covered with the retaining ring. In this way, the outer circumferential surface of the bearing portion formed of a nonmetallic sintering material can be protected from being damaged by impact and the like. Here, a state in which the outer circumferential surface of the bearing portion is entirely covered with the retaining ring does not need to be a state in which the outer circumferential surface of the bearing portion is completely entirely covered with the retaining ring, but refers to a state in which the bearing portion is substantially entirely covered with the retaining ring to such an extent that other members and the outer circumferential surface of the bearing portion are not in direct contact with one another upon handling the sleeve and operating the gas bearing spindle.

In the gas bearing spindle, the sleeve may further include a gas discharge path connecting a boundary portion, which exists between the retaining ring and the bearing portion and connects the first fit surface and the second fit surface to each other, to a region located in the gas bearing spindle and open to external atmosphere.

In the boundary portion between the retaining ring and the bearing portion, a small clearance exists. When hermeticity in the second fit surface is not sufficient, a compressed gas supplied to the spindle leaks to the small clearance to provide the retaining ring with force in the axial direction. In order to address this, by adopting the above-described configuration, the compressed gas having leaked to the small clearance can be discharged via the gas discharge path to get out of the spindle, thereby reducing the force imposed on the retaining ring.

In the gas bearing spindle, preferably, the gas discharge path is formed in the retaining ring. In this way, the gas discharge path can be formed without decreasing the strength of the bearing portion formed of a nonmetallic sintering material having a small Young's modulus.

In the gas bearing spindle, a boundary portion existing between the retaining ring and the bearing portion and connecting the first fit surface and the second fit surface to each other may be filled with a molding material.

As described above, a small clearance exists in the boundary portion between the retaining ring and the bearing portion, whereby the retaining ring may receive force in the axial direction. In order to address this, by adopting above-described configuration, the gas can be prevented from entering the small clearance to achieve reduced force imposed on the retaining ring and effectively achieve increased fastening force of the bearing portion and the retaining ring. It should be noted that the molding material employed herein may be, for example, an adhesive agent.

In the gas bearing spindle, preferably, the sleeve further includes a molding material supply path, connecting the boundary portion to outside of the sleeve, for supplying the boundary portion with the molding material. In this way, the boundary portion between the retaining ring and the bearing portion can be readily filled with the molding material.

In the gas bearing spindle, preferably, the molding material supply path is formed to connect the boundary portion to a region located in the gas bearing spindle and open to external atmosphere. In this way, the molding material supply path is always open to the external atmosphere, so the compressed gas never leaks into the boundary portion via the molding material supply path when the spindle is supplied with the compressed gas.

In the gas bearing spindle, preferably, the molding material supply path is formed in the retaining ring. In this way, the molding material supply path can be formed without decreasing the strength of the bearing portion formed of a nonmetallic sintering material having a small Young's modulus.

In the gas bearing spindle, preferably, the sleeve further includes an air discharge path, connecting the boundary portion to outside of the sleeve, for discharging air from the boundary portion when filling the boundary portion with the molding material. In this way, the boundary portion between the retaining ring and the bearing portion can be filled with the molding material more readily.

In the gas bearing spindle, preferably, the air discharge path is formed to connect the boundary portion to a region located in the gas bearing spindle and open to external atmosphere. In this way, the air discharge path is always open to the external atmosphere, so the compressed gas never leaks into the boundary portion via the air discharge path when the spindle is supplied with the compressed gas.

In the gas bearing spindle, preferably, the air discharge path is formed in the retaining ring. In this way, the air discharge path can be formed without decreasing the strength of the bearing portion formed of a nonmetallic sintering material having a small Young's modulus.

As apparent from the description above, according to the gas bearing spindle of the present invention, there can be provided a gas bearing spindle capable of preventing deviation of a retaining ring when a compressed gas is supplied thereto.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
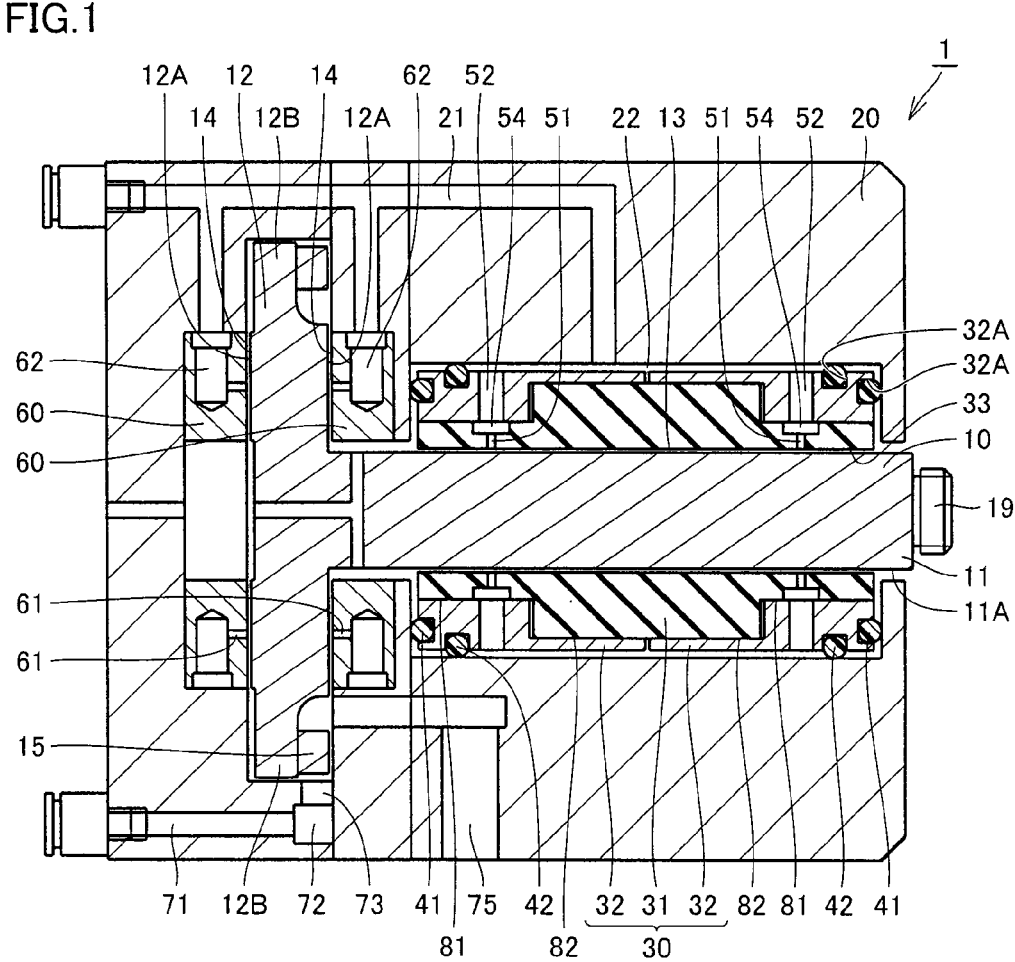
FIG. 1 is a schematic cross sectional view showing a configuration of a gas bearing spindle.

The following describes embodiments of the present invention with reference to figures. It should be noted that in the figures, the same or equivalent portions are given the same reference characters and are not described repeatedly.

First Embodiment

First, one embodiment of the present invention, a first embodiment, will be described. Referring to FIG. 1, a gas bearing spindle 1 in the first embodiment includes a rotation shaft 10; a sleeve 30 having a sleeve through hole 33, which is a cylindrical through hole that surrounds a portion of an outer circumferential surface 11A of rotation shaft 10; and a housing 20 surrounding sleeve 30 to retain sleeve 30 by means of O rings 41, 42 each serving as an elastic member and formed of a rubber. Rotation shaft 10 and sleeve 30 are disposed with a journal bearing clearance 13 of approximately 10 µm or greater but approximately 40 µm or smaller therebetween.

Rotation shaft 10 has a shaft portion 11 cylindrical in shape; and a flange portion 12 formed in one end of shaft portion 11 and having a large disk-like shape with a diameter larger than that of shaft portion 11. In the other end of shaft portion 11, a retaining unit 19 is formed to retain a tool or the like. Sleeve 30 is provided with a plurality of journal nozzles 51 formed in the circumferential wall of sleeve 30 to supply a gas for bearing to a journal bearing clearance 13 provided between the inner circumferential surface of sleeve through hole 33 and outer circumferential surface 11A of shaft portion 11 of rotation shaft 10.

Journal nozzles 51 are arranged in two rows extending in the circumferential direction of sleeve through hole 33. Specifically, journal nozzles 51 are provided in the rows at respective sides that interpose therebetween the central portion of sleeve 30 in a direction in which sleeve through hole 33 extends (axial direction of shaft portion 11 of rotation shaft 10).

Furthermore, sleeve 30 includes a bearing portion 31 formed of a nonmetallic sintered body and retaining rings 32 each formed of a metal. Bearing portion 31 has sleeve through hole 33, and is configured so that the inner circumferential surface of sleeve through hole 33 is opposite to outer circumferential surface 11A of rotation shaft 10. Retaining rings 32 are fit into the outer portion of bearing portion 31 to retain bearing portion 31 relative to housing 20 by means of O rings 41, 42 each serving as an elastic member and formed of a rubber. Retaining rings 32 are fit into bearing portion 31 by means of, for example, shrink-fitting.

With the above-described configuration, sleeve 30 serves as a gas journal bearing for supporting rotation shaft 10 relative to housing 20 in a non-contact manner in a direction (radial direction) perpendicular to the axial direction of shaft portion 11. It should be noted that journal nozzles 51 are preferably formed so that distances from the central portion of sleeve 30 in the axial direction of shaft portion 11 to journal nozzles 51 on the opposite sides are substantially equal to each other. In this way, pressure distribution is substantially symmetrical in the axial direction within journal bearing clearance 13, whereby rotation shaft 10 is supported relative to sleeve 30 in the axial direction in a balanced manner.

Furthermore, in housing 20, a thrust bearing 60 annular in shape is disposed so that one base surface of thrust bearing 60 is opposite to each of base surfaces 12A of the opposite sides of flange portion 12 of rotation shaft 10. Here, thrust bearing 60 and flange portion 12 of rotation shaft 10 are separated with a thrust bearing clearance 14 of approximately 10 µm or greater but approximately 50 µm or smaller therebetween. Thrust bearing 60 is provided with a plurality of thrust nozzles 61 for supplying a gas to thrust bearing clearance 14 provided between the one base surface of thrust bearing 60 and each of base surfaces 12A of flange portion 12 opposite thereto. The plurality of thrust nozzles 61 are formed in a direction along the circumferential direction of flange portion 12.

Each of journal nozzles 51 is connected to a bearing gas supply path 21, which is formed within housing 20, via a gas supply groove 54, a sleeve gas supply path 52, and an annular space 22, which is a space closed by sleeve 30, housing 20, and O ring 42. Gas supply groove 54 is an annular groove formed in each of retaining rings 32 to encompass a first fit surface 81, which is a surface at which bearing portion 31 and a retaining ring 32 are in contact with each other. In addition, gas supply groove 54 communicates sleeve gas supply path 52, provided in each retaining ring 32, to journal nozzles 51 provided in bearing portion 31.

On the other hand, each of thrust nozzles 61 is connected to bearing gas supply path 21 via a thrust bearing gas supply path 62. Further, bearing gas supply path 21 is connected to a bearing gas supply source, such as an air compressor, having a function of supplying a high-pressure gas such as air, disposed external to gas bearing spindle 1, and not shown in the figure.

Further, in a portion of flange portion 12, i.e., in an outer circumferential portion thereof, there is formed a thin portion 12B having an axial thickness thinner than that of adjacent portion in flange portion 12. On one base surface of thin portion 12B, turbine blades 15 are formed. Turbine blades 15 thus formed are arranged in the circumferential direction of flange portion 12, have a plate-like shape, and are adapted to receive an incoming gas to rotate rotation shaft 10 in the circumferential direction of flange portion 12. Furthermore, in housing 20, a turbine nozzle 73 is formed at an outer circumferential side relative to flange portion 12. Turbine nozzle 73 has an opening at its portion facing turbine blades 15, and is configured to be capable of jetting a drive gas such as a compressed gas from the inner wall of housing 20 toward turbine blade 15. Turbine nozzle 73 is connected to a drive gas supply path 71 via a circumferential groove 72 formed to extend in the direction along the outer circumference of flange portion 12. Drive gas supply path 71 is connected to a drive gas supply source, such as an air compressor, having a function of supplying a high-pressure gas such as air, disposed external to gas bearing spindle 1, and not shown in the figure. Furthermore, housing 20 is provided with a drive gas discharge path 75 having one opening and the other opening. The one opening is provided in the surface thereof at the side where turbine blades 15 on thin portions 12B of flange portion 12 are formed, specifically, is provided at a location opposite to a region at an inner circumferential side relative to the region in which turbine blades 15 are formed. The other opening is formed at an outer wall of housing 20.

Figure 2:
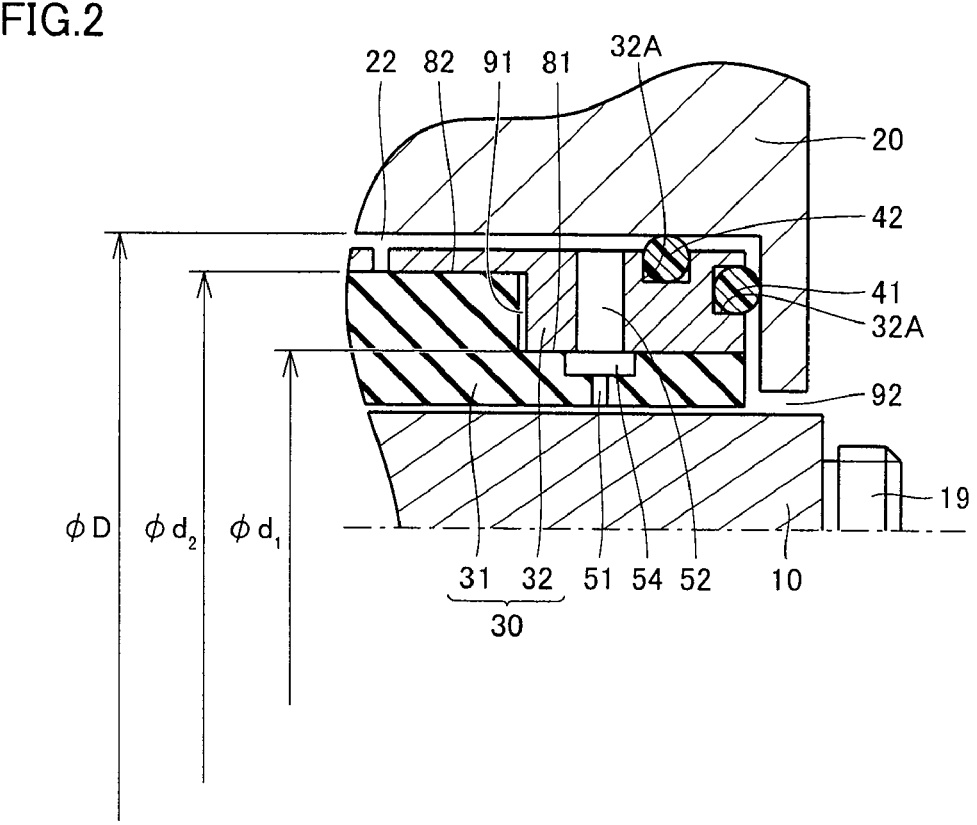
FIG. 2 is a schematic partial cross sectional view showing a main portion of the gas bearing spindle.

Here, referring to FIGS. 1 and 2, retaining rings 32, formed in pair, are arranged side by side in the direction in which sleeve through hole 33 extends. Retaining rings 32 and bearing portion 31 are in contact with each other at first fit surfaces 81 and a second fit surface 82. Each of first fit surfaces 81 is a boundary surface between the outer circumferential surface of bearing portion 31 and the inner circumferential surface of each of retaining rings 32, and extends from an axial end thereof. Second fit surface 82 has a diameter larger than those of first fit surfaces 81, and is a boundary surface between the outer circumferential surface of bearing portion 31 and the inner circumferential surface of each of retaining rings 32 in the vicinity of the center thereof in the axial direction when viewed from first fit surfaces 81.

Namely, gas bearing spindle 1 in the present embodiment includes rotation shaft 10; sleeve 30 having sleeve through hole 33 that is a cylindrical through hole surrounding a portion of outer circumferential surface 11A of rotation shaft 10; and housing 20 surrounding sleeve 30 to retain sleeve 30 by means of O rings 41, 42 each serving as an elastic member and formed of a rubber. Sleeve 30 includes: bearing portion 31 having sleeve through hole 33 and formed of a nonmetallic sintered body; and retaining rings 32 fit into the outer circumferential surface of bearing portion 31 to retain sleeve 30 relative to housing 20 by means of O rings 41, 42 and formed of a metal. Retaining rings 32 and bearing portion 31 are in contact with one another at first fit surfaces 81 that are boundary surfaces among the outer circumferential surface of bearing portion 31 and the inner circumferential surfaces of retaining rings 32, as well as at second fit surface 82 that is distant further away from sleeve through hole 33 (distant away from the center axis of sleeve through hole 33) relative to first fit surface 81 and that is a boundary surface, between the outer circumferential surface of bearing portion 31 and the inner circumferential surface of each retaining ring 32 in the vicinity of the center of sleeve through hole 33 relative to first fit surface 81 in the direction in which sleeve through hole 33 extends.

Next, referring to FIG. 1, operations of gas bearing spindle 1 of the first embodiment will be described. A gas for bearing, such as a compressed gas, is supplied from a bearing gas supply source not shown in the figure to journal bearing clearance 13 via bearing gas supply path 21, annular space 22, sleeve gas supply paths 52, gas supply grooves 54, and journal nozzles 51. Also, the gas for bearing from the bearing gas supply source not shown in the figure is supplied to thrust bearing clearance 14 via bearing gas supply path 21, thrust bearing gas supply path 62, and thrust nozzle 61. In this way, the gas for bearing thus supplied thereto forms gas films in journal bearing clearance 13 and thrust bearing clearance 14. As a result, rotation shaft 10 is rotatably supported in a non-contact manner relative to housing 20 in the axial direction of rotation shaft 10 and in the direction (radial direction) perpendicular to the axial direction thereof.

Meanwhile, a drive gas from a drive gas supply source, such as an air compressor, not shown in the figure is supplied from drive gas supply path 71 to turbine nozzle 73 via circumferential groove 72. The drive gas thus supplied to turbine nozzle 73 issues in a jet toward turbine blades 15. Then, turbine blades 15 receive the drive gas having issued in a jet, thereby providing flange portion 12 with driving force (torque) for rotation around the axis of rotation shaft 10. This causes rotation shaft 10 to rotate around its axis. The drive gas thus having provided the driving force to rotation shaft 10 is then discharged from drive gas discharge path 75 to get out of gas bearing spindle 1.

Figure 5:
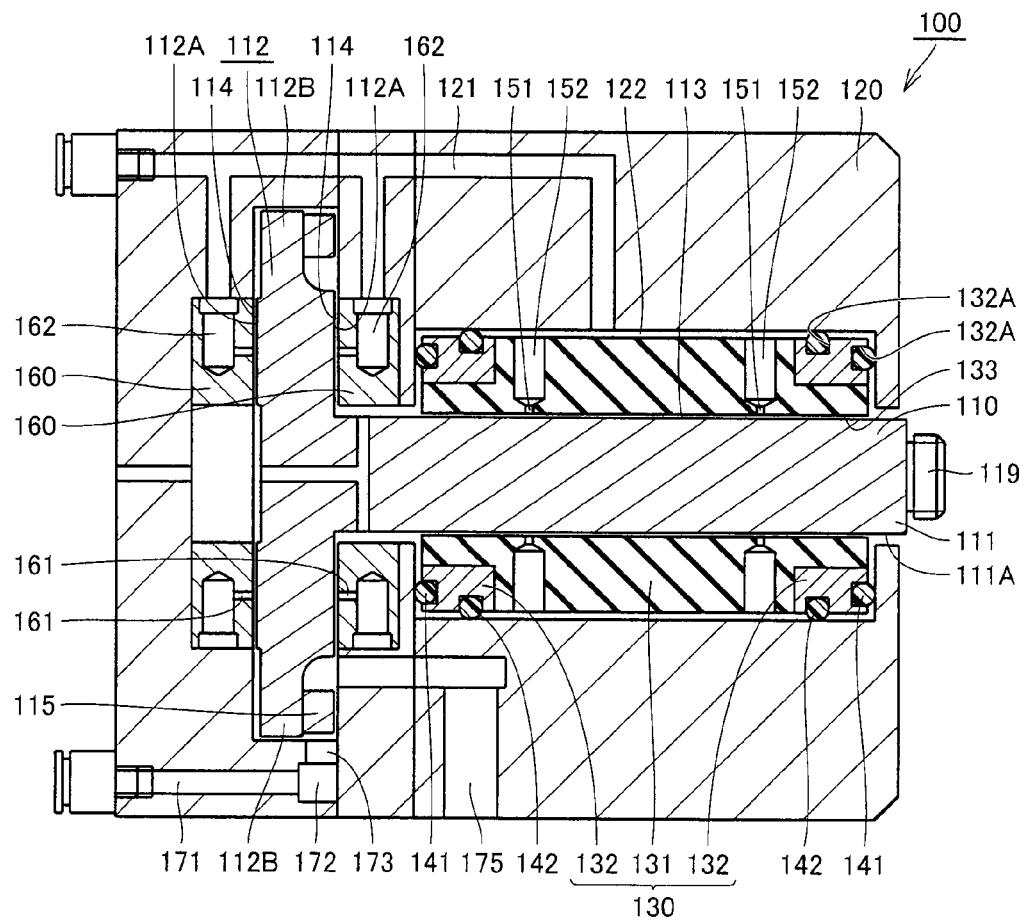
FIG. 5 is a schematic cross sectional view showing an exemplary conventional gas bearing spindle.
Figure 6:
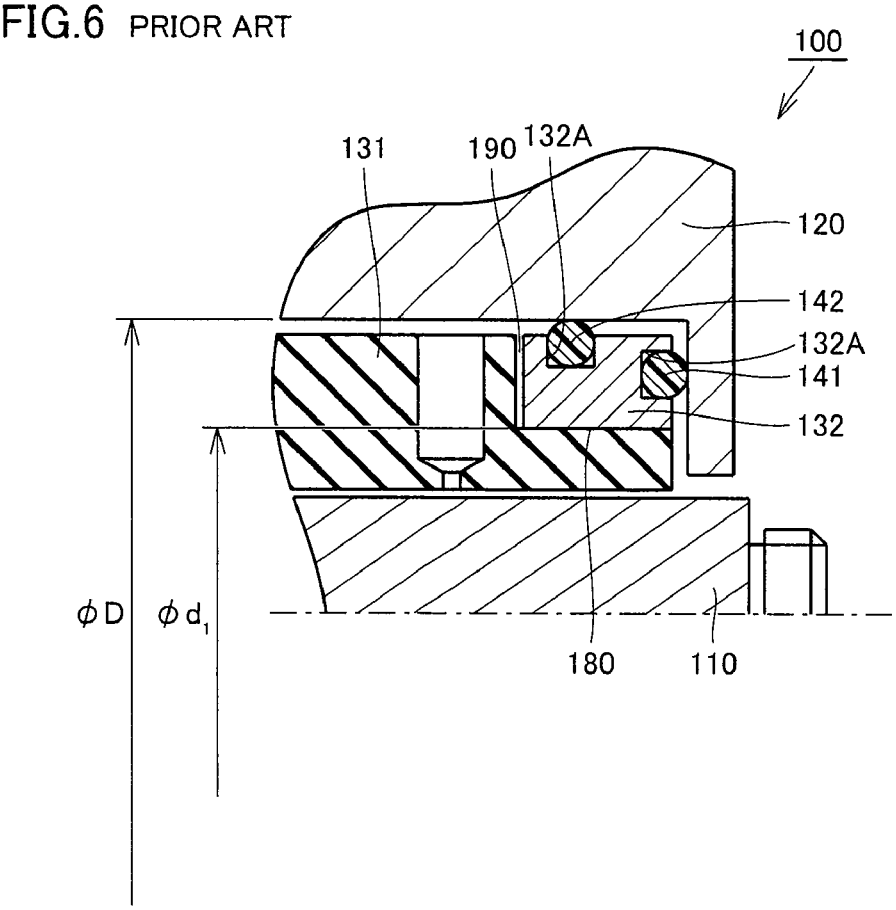
FIG. 6 is a schematic cross sectional view showing an exemplary supporting structure of a sleeve in the conventional gas bearing spindle.
Figure 7:
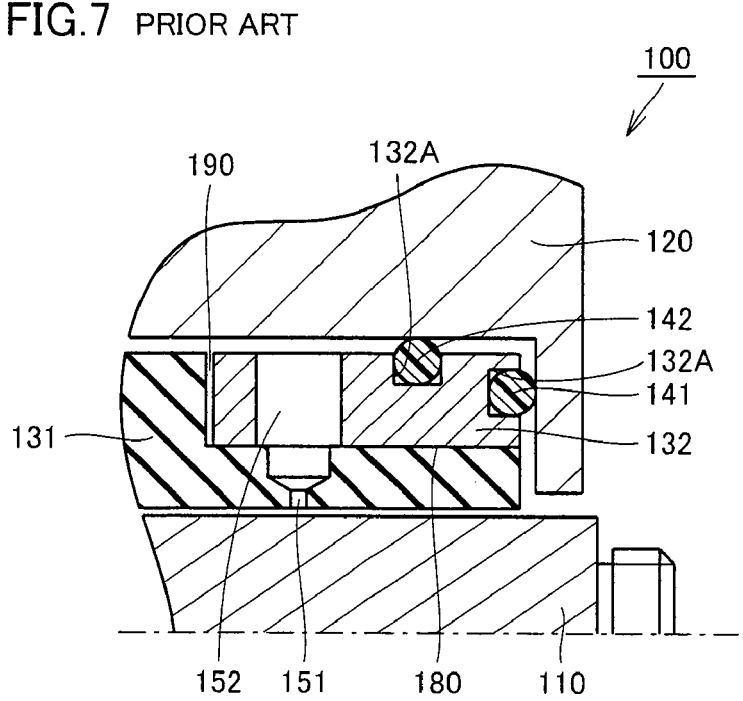
FIG. 7 is a schematic partial cross sectional view showing the exemplary supporting structure of the sleeve in the conventional gas bearing spindle.

Here, referring to FIG. 2, bearing portion 31 and retaining rings 32 are in contact with one another at first fit surfaces 81 that are cylindrical surfaces located adjacent to the axial ends and has diameter $\phi d_1$, as well as at second fit surface 82 that is a cylindrical surface located at an inner side relative to first fit surfaces 81 in the axial direction and has a diameter $\phi d_2$ larger than $\phi d_1$. Therefore, due to a difference in pressure between the supplied compressed gas and the atmosphere, retaining rings 32 receive axial force proportional to the area of an annular geometry having an outer diameter $\phi D$ (D indicates the outer diameter of each retaining ring 32) and inner diameter $\phi d_2$. Since the diameter of second fit surface 82 is larger than that of each of first fit surfaces 81, the area receiving the pressure is smaller than that in conventional gas bearing spindle 100 (see FIGS. 5 and 6) in which force proportional to the area of an annular geometry having outer diameter 40 and inner diameter $\phi d_1$ is received. Accordingly, smaller force is imposed on retaining ring 32 in the axial direction.

On the other hand, fastening force obtained by the fitting is in proportion to the area of the fit surfaces. In gas bearing spindle 1 in the present embodiment, the diameter of second fit surface 82 is larger than those of first fit surfaces 81, so an area per unit length in the axial direction is large in the fit surfaces, thereby achieving strong fastening. Further, circumferential fastening torque obtained through the fitting is in proportional to the size of diameter of a fit surface. In gas bearing spindle 1 in the present embodiment, the diameter of second fit surface 82 is larger than those of first fit surfaces 81, so strong fastening torque is likely to be obtained. Accordingly, even if rotation shaft 10 rotating fast is brought into contact with bearing portion 31, the deviation between bearing portion 31 and retaining ring 32 in the rotation direction is suppressed.

Further, retaining rings 32 of gas bearing spindle 1 in the present embodiment do not need to be thinned in the radial direction thereof at their regions in which grooves for retaining O rings 41, 42 are to be formed (regions adjacent to the outer circumferences of first fit surfaces 81). This allows grooves 32A for retaining O rings 41, 42 to be readily formed. Further, upon machining the inner circumferential surface of sleeve 30 in the process of manufacturing sleeve 30, it is desirable to retain sleeve 30 so that stress is imposed on retaining rings 32 each formed of a metal and having a toughness higher than that of bearing portion 31 formed of a nonmetallic sintered body. In gas bearing spindle 1 in the present embodiment, retaining rings 32 have sufficiently thick thicknesses at their portions adjacent to the outer circumferences of first fit surfaces 81 to secure the outer circumferential surfaces of the above-described regions of retaining rings 32. In this way, sleeve 30 can be prevented from being deformed by stress generated upon retention of sleeve 30. As a result, the inner circumferential surface of sleeve 30 can be readily machined with precision.

In gas bearing spindle 1 in the present embodiment, bearing portion 31 is provided with journal nozzles 51, each having an opening to face sleeve through hole 33, for supplying a gas to journal bearing clearance 13 that is a clearance between sleeve 30 and rotation shaft 10, whereas each of retaining rings 32 is provided with sleeve gas supply path 52 penetrating retaining ring 32. Here, in a region including a boundary between retaining ring 32 of sleeve 30 and bearing portion 31, gas supply groove 54 annular in shape and communicating sleeve gas supply path 52 with each of journal nozzles 51 to supply a gas to journal nozzles 51 is preferably formed to surround sleeve through hole 33. Gas supply groove 54 is not an essential configuration, but, by forming gas supply groove 54 annular in shape, the compressed gas supplied to sleeve gas supply path 52 is supplied to journal bearing clearance 13 via gas supply groove 54 and journal nozzle 51 even if rotation shaft 10 rotating fast is brought into contact with bearing portion 31 and accordingly retaining ring 32 and bearing portion 31 are deviated from each other in the circumferential direction. As such, even if retaining ring 32 and bearing portion 31 are deviated from each other in the circumferential direction, the compressed gas is supplied to journal bearing clearance 13 more securely. Further, gas supply groove 54 thus formed eliminates a need of aligning sleeve gas supply path 52 and journal nozzle 51 with each other in the circumferential direction upon assembly of bearing portion 31 and retaining ring 32 in the process of manufacturing sleeve 30.

Furthermore, as shown in FIG. 2, gas supply groove 54 is preferably formed to encompass first fit surface 81. In this way, the effect resulting from the formation of gas supply groove 54 can be obtained without hindering fastening force and hermeticity from being provided by second fit surface 82.

Further, as shown in FIG. 1, in the gas bearing spindle of the present embodiment, it is preferable that the outer circumferential surface of bearing portion 31 be entirely covered with retaining rings 32. In this way, not only fastening force can be obtained at maximum through the shrink-fitting, but also the outer circumferential surface of bearing portion 31 formed of a nonmetallic sintering material can be protected from being damaged by impact or the like. Furthermore, in the gas bearing spindle of the present embodiment, each of retaining rings 32 has a thin portion located adjacent to the outer circumference of second fit surface 82, so increase in mass can be kept to the minimum even though retaining rings 32 cover the entire outer circumferential surface of sleeve 30. Generally, an increased mass of sleeve 30 results in decreased natural frequency of the entire system supported by O rings 41, 42, and decreased responsiveness of sleeve 30 to whirling vibration of rotation shaft 10. In contrast, by adopting the structure of the present embodiment, increase in mass can be kept to the minimum, thus keeping to the minimum the influence over the effect provided by elasticity of O rings 41, 42 to attenuate the whirling vibration of rotation shaft 10.

Second Embodiment

Figure 3:
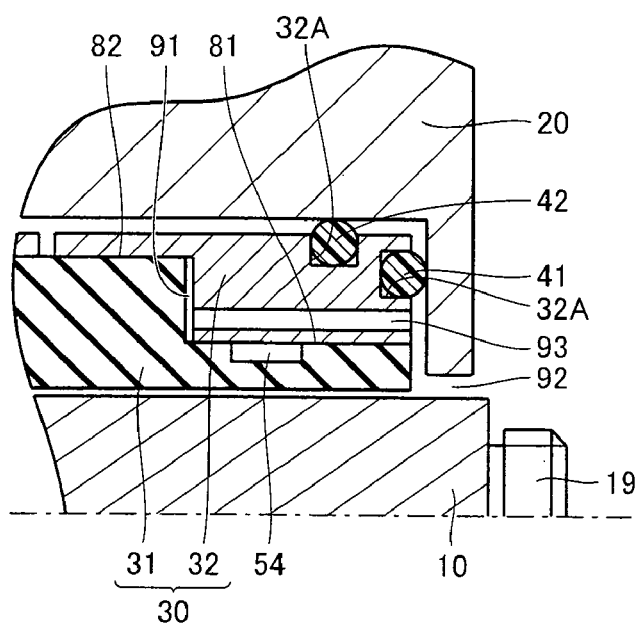
FIG. 3 is a schematic partial cross sectional view showing a main portion of a gas bearing spindle.

The following describes another embodiment of the present invention, a second embodiment. A gas bearing spindle 1 of the second embodiment has a configuration basically the same as that of gas bearing spindle 1 of the first embodiment, operates in a similar manner, and provides a similar effect. However, referring to FIG. 3, gas bearing spindle 1 of the second embodiment is different from gas bearing spindle 1 of the first embodiment in that a gas discharge path 93 is formed therein.

Specifically, in gas bearing spindle 1 of the second embodiment, a sleeve 30 is provided with gas discharge path 93 for connecting a boundary portion between each retaining ring 32 and a bearing portion 31 to a region located in gas bearing spindle 1 and open to external atmosphere. Via the boundary portion, a first fit surface 81 and second fit surfaces 82 are connected to one another. As described above, bearing portion 31 and retaining rings 32 are engaged with first fit surface 81 and second fit surfaces 82, but there exists a small fit portion clearance 91 in the boundary portion between each of retaining rings 32 and bearing portion 31, via which first fit surface 81 and second fit surfaces 82 are connected to one another. Here, when hermeticity in second fit surfaces 82 is not sufficient, a compressed gas supplied to the spindle leaks into fit portion clearance 91 and generates a pressure, whereby retaining ring 32 receives force in the axial direction. In order to address this, gas discharge path 93 connecting fit portion clearance 91 and the region located in gas bearing spindle 1 and open to external atmosphere (for example, a sleeve end side clearance 92 that is a clearance between an end of sleeve 30 and housing 20) is provided, whereby the unnecessary pressure generated by the leaked compressed gas can be relieved. Accordingly, the axial force generated in retaining ring 32 can be reduced.

Here, gas discharge path 93 is preferably formed in retaining ring 32. In this way, gas discharge path 93 can be formed without decreasing the strength of bearing portion 31 formed of a nonmetallic sintering material having a small Young's modulus.

Third Embodiment

Figure 4:
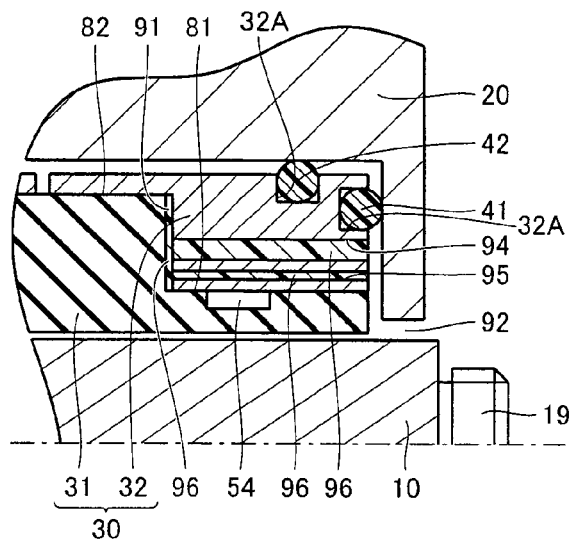
FIG. 4 is a schematic partial cross sectional view showing a main portion of a gas bearing spindle.

The following describes still another embodiment of the present invention, a third embodiment. A gas bearing spindle 1 of the third embodiment has a configuration basically the same as that of gas bearing spindle 1 of the first embodiment, operates in a similar manner, and provides a similar effect. However, referring to FIG. 4, gas bearing spindle 1 of the third embodiment is different from gas bearing spindle 1 of the first embodiment in that a fit portion clearance 91 existing to connect first fit surface 81 and second fit surfaces 82 in sleeve 30 to one another is filled with a molding material 96 such as an adhesive agent.

Namely, in gas bearing spindle 1 of the third embodiment, the boundary portion between each retaining ring 32 and bearing portion 31, i.e., portion via which first fit surface 81 and each second fit surface 82 are connected to each other is filled with molding material 96.

Since the small fit portion clearance 91 exists in the boundary portion between retaining ring 32 and bearing portion 31 as described above, retaining ring 32 may receive axial force. In order to address this, in gas bearing spindle 1 of the third embodiment, fit portion clearance 91 is filled with molding material 96 to prevent a gas from entering fit portion clearance 91. In this way, axial force imposed on retaining ring 32 can be reduced. Further, by the shrink-fitting of bearing portion 31 and retaining ring 32 as well as the filling with molding material 96, fastening force of bearing portion 31 and retaining ring 32 can be effectively increased.

Here, in gas bearing spindle 1 of the present embodiment, sleeve 30 is preferably provided with a molding material supply path 94, which connects the boundary portion between retaining ring 32 and bearing portion 31 to the outside of sleeve 30, for supplying molding material 96 to the boundary portion. In this way, the boundary portion between retaining ring 32 and bearing portion 31 can be readily filled with molding material 96. Furthermore, molding material supply path 94 is preferably formed to connect the boundary portion to the region (such as a sleeve end side clearance 92) located in gas bearing spindle 1 and open to the external atmosphere. In this way, when gas bearing spindle 1 is supplied with a compressed gas, the compressed gas never leaks from molding material supply path 94 to the boundary portion. Furthermore, molding material supply path 94 is preferably formed in retaining ring 32. In this way, molding material supply path 94 can be formed without decreasing the strength of bearing portion 31 formed of a nonmetallic sintering material having a small Young's modulus.

Further, in gas bearing spindle 1 of the present embodiment, sleeve 30 is preferably provided with an air discharge path 95, which connects the boundary portion and the outside of sleeve 30 to each other, for discharging air from the boundary portion upon filling the boundary portion with molding material 96. In this way, the boundary portion between the retaining ring and the bearing portion can be filled with molding material 96 more readily. Furthermore, air discharge path 95 is preferably formed to connect the boundary portion to the region (such as sleeve end side clearance 92) located in gas bearing spindle 1 and open to the external atmosphere. In this way, when gas bearing spindle 1 is supplied with a compressed gas, the compressed gas never leaks from air discharge path 95 to the boundary portion. Furthermore, air discharge path 95 is preferably formed in retaining ring 32. In this way, air discharge path 95 can be formed without decreasing the strength of bearing portion 31 formed of a nonmetallic sintering material having a small Young's modulus.

Here, in the case where the structure provided with molding material supply path 94 and air discharge path 95 as described above is employed, fit portion clearance 91 can be readily filled with molding material 96 in the following procedure. First, bearing portion 31 and retaining rings 32 are assembled through shrink-fitting. Thereafter, molding material 96 is injected via molding material supply path 94 to fill fit portion clearance 91 with molding material 96 and discharge air from fit portion clearance 91 via air discharge path 95.

On the other hand, in the case where no molding material supply path 94 is formed, fit portion clearance 91 can be filled with molding material 96 in the following procedure. First, molding material 96 is applied to at least one of the surfaces, which are to constitute fit portion clearance 91, of bearing portion 31 and retaining rings 32. Thereafter, bearing portion 31 and retaining rings 32 are shrink-fit. In this case, molding material supply path 94 is not required but it is preferable to form air discharge path 95. By providing air discharge path 95, unnecessary air can be effectively discharged from fit portion clearance 91 upon the shrink-fitting, and fit portion clearance 91 can be therefore entirely filled with the molding material readily.

A gas bearing spindle of the present invention is advantageously applicable particularly to a gas bearing spindle used in precision machining equipment, a hole drilling machine, an electrostatic coating machine, or the like.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A gas bearing spindle comprising:
   a rotation shaft;
   a sleeve having a sleeve through hole, which is a cylindrical through hole surrounding at least a portion of an outer circumferential surface of said rotation shaft; and
   a housing, surrounding said sleeve, for retaining said sleeve using an elastic member,
   said sleeve including
   a bearing portion having said sleeve through hole and formed of a nonmetallic sintered body, and
   a retaining ring, fit into an outer circumferential surface of said bearing portion and formed of a metal, for retaining said bearing portion relative to said housing using said elastic member,
   said retaining ring and said bearing portion being in contact with each other at a first fit surface, which is a boundary surface between the outer circumferential surface of said bearing portion and an inner circumferential surface of said retaining ring, as well as at a second fit surface, which is a boundary surface between the outer circumferential surface of said bearing portion and the inner circumferential surface of said retaining ring, is distant further away from a central axis of said sleeve through hole relative to said first fit surface, and is formed adjacent to a center of said sleeve through hole in a direction in which said sleeve through hole extends, when viewed from said first fit surface.

2. The gas bearing spindle according to claim 1, wherein:
   said bearing portion is provided with a nozzle, having an opening to face said sleeve through hole, for supplying a gas to a bearing clearance which is a clearance between said sleeve and said rotation shaft,
   said retaining ring is provided with a sleeve gas supply path penetrating said retaining ring, and
   in a region including a boundary between said retaining ring and said bearing portion of said sleeve, a gas supply groove annular in shape and communicating said sleeve gas supply path and said nozzle with each other to supply a gas to said nozzle is formed to surround said sleeve through hole.

3. The gas bearing spindle according to claim 2, wherein said gas supply groove is formed to encompass said first fit surface.

4. The gas bearing spindle according to claim 1, wherein the outer circumferential surface of said bearing portion is entirely covered with said retaining ring.

5. The gas bearing spindle according to claim 1, wherein said sleeve further includes a gas discharge path connecting a boundary portion, which exists between said retaining ring and said bearing portion and connects said first fit surface and said second fit surface to each other, to a region located in said gas bearing spindle and open to external atmosphere.

6. The gas bearing spindle according to claim 5, wherein said gas discharge path is formed in said retaining ring.

7. The gas bearing spindle according to claim 1, wherein a boundary portion existing between said retaining ring and said bearing portion and connecting said first fit surface and said second fit surface to each other is filled with a molding material.

8. The gas bearing spindle according to claim 7, wherein said sleeve further includes a molding material supply path, connecting said boundary portion to outside of said sleeve, for supplying said boundary portion with said molding material.

9. The gas bearing spindle according to claim 8, wherein said molding material supply path is formed to connect said boundary portion to a region located in said gas bearing spindle and open to external atmosphere.

10. The gas bearing spindle according to claim 8, wherein said molding material supply path is formed in said retaining ring.

11. The gas bearing spindle according to claim 7, wherein said sleeve further includes an air discharge path, connecting said boundary portion to outside of said sleeve, for discharging air from said boundary portion when filling said boundary portion with said molding material.

12. The gas bearing spindle according to claim 11, wherein said air discharge path is formed to connect said boundary portion to a region located in said gas bearing spindle and open to external atmosphere.

13. The gas bearing spindle according to claim 11, wherein said air discharge path is formed in said retaining ring.

* * * * *